United States Patent
Au et al.

(10) Patent No.: US 10,880,063 B2
(45) Date of Patent: *Dec. 29, 2020

(54) SYSTEM AND METHOD OF UE-CENTRIC RADIO ACCESS PROCEDURE

(71) Applicant: HUAWEI TECHNOLOGIES CO., LTD., Shenzhen (CN)

(72) Inventors: Kelvin Kar Kin Au, Ottawa (CA); Liqing Zhang, Ottawa (CA); Mohammadhadi Baligh, Ottawa (CA); Jianglei Ma, Ottawa (CA); Wen Tong, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/165,585

(22) Filed: Oct. 19, 2018

(65) Prior Publication Data

US 2019/0058563 A1 Feb. 21, 2019

Related U.S. Application Data

(63) Continuation of application No. 15/165,985, filed on May 26, 2016, now Pat. No. 10,735,166.

(60) Provisional application No. 62/168,658, filed on May 29, 2015.

(51) Int. Cl.
*H04L 5/00* (2006.01)
*H04W 74/00* (2009.01)

(52) U.S. Cl.
CPC ......... *H04L 5/0051* (2013.01); *H04W 74/006* (2013.01); *H04L 5/0073* (2013.01)

(58) Field of Classification Search
None
See application file for complete search history.

(56) References Cited

U.S. PATENT DOCUMENTS

| | | | |
|---|---|---|---|
| 8,867,455 B2 | 10/2014 | Sambhwani et al. | |
| 9,008,025 B2 | 4/2015 | Chun et al. | |
| 9,301,324 B2 | 3/2016 | Lee | |
| 9,462,555 B2 | 10/2016 | Jain et al. | |
| 9,635,608 B2 | 4/2017 | Onaka et al. | |
| 9,736,774 B2 | 8/2017 | Au et al. | |
| 2005/0122936 A1 | 6/2005 | Son et al. | |
| 2008/0069042 A1 | 3/2008 | Ballarini | |
| 2008/0153426 A1 | 6/2008 | Son et al. | |
| 2009/0135769 A1* | 5/2009 | Sambhwani | H04L 5/0053 370/329 |
| 2009/0238251 A1 | 9/2009 | Rofougaran | |

(Continued)

FOREIGN PATENT DOCUMENTS

| | | | |
|---|---|---|---|
| JP | 2005514882 A | 5/2005 | |
| JP | 2007509526 A | 4/2007 | |

(Continued)

OTHER PUBLICATIONS

International Search Report and Written Opinion, PCT/CN2016/083803, dated Sep. 5, 2016.

*Primary Examiner* — Donald L Mills

(57) ABSTRACT

A method and system for operating a user equipment (UE) wherein a first set of radio access procedures are supported when the UE is in a first operating state, and a second set of radio access procedures are supported when the UE is in a second operating state.

19 Claims, 15 Drawing Sheets

(56) References Cited

U.S. PATENT DOCUMENTS

| | | |
|---|---|---|
| 2010/0054166 A1 | 3/2010 | Jung |
| 2010/0061290 A1 | 3/2010 | Chen |
| 2010/0080125 A1* | 4/2010 | Olsson ................. H04W 72/14 370/235 |
| 2010/0120448 A1 | 5/2010 | Iwamura et al. |
| 2010/0130217 A1 | 5/2010 | Wu |
| 2011/0039568 A1* | 2/2011 | Zhang .................. H04W 52/50 455/452.1 |
| 2011/0170515 A1* | 7/2011 | Kim .................... H04W 72/042 370/330 |
| 2011/0190001 A1* | 8/2011 | Kodikara Patabandi .................... H04W 76/11 455/450 |
| 2012/0009926 A1 | 1/2012 | HéVizi et al. |
| 2012/0113904 A1* | 5/2012 | Anderson ............ H04W 76/28 370/329 |
| 2012/0127934 A1* | 5/2012 | Anderson ......... H04W 72/0406 370/329 |
| 2012/0213137 A1 | 8/2012 | Jeong et al. |
| 2012/0213196 A1* | 8/2012 | Chung .................. H04B 1/713 370/330 |
| 2012/0275366 A1* | 11/2012 | Anderson ......... H04W 52/0219 370/311 |
| 2012/0327865 A1 | 12/2012 | Hottinen |
| 2013/0003591 A1 | 1/2013 | Novak et al. |
| 2013/0208667 A1 | 8/2013 | Merlin et al. |
| 2013/0235780 A1 | 9/2013 | Kim et al. |
| 2013/0260801 A1 | 10/2013 | Kim et al. |
| 2014/0073287 A1 | 3/2014 | Zhang et al. |
| 2014/0113643 A1 | 4/2014 | Ma et al. |
| 2014/0146678 A1 | 5/2014 | Merlin et al. |
| 2014/0179293 A1 | 6/2014 | Li et al. |
| 2014/0192767 A1 | 7/2014 | Au et al. |
| 2014/0254544 A1 | 9/2014 | Au et al. |
| 2015/0003263 A1 | 1/2015 | Senarath et al. |
| 2015/0049753 A1* | 2/2015 | Park .................. H04W 56/0045 370/350 |
| 2015/0098400 A1 | 4/2015 | Lee et al. |
| 2015/0128990 A1 | 5/2015 | Brown |
| 2015/0141002 A1 | 5/2015 | Ma et al. |
| 2015/0181546 A1 | 6/2015 | Freda et al. |
| 2015/0195788 A1 | 7/2015 | Au et al. |
| 2015/0264638 A1 | 9/2015 | Han et al. |
| 2015/0304799 A1 | 10/2015 | Park et al. |
| 2015/0327245 A1* | 11/2015 | Zhu ....................... H04W 72/02 370/329 |
| 2015/0351132 A1 | 12/2015 | Park et al. |
| 2015/0358827 A1 | 12/2015 | Bendlin et al. |
| 2016/0029309 A1 | 1/2016 | Kim et al. |
| 2016/0119931 A1 | 4/2016 | Soriaga et al. |
| 2016/0135247 A1 | 5/2016 | Ozturk et al. |
| 2016/0143086 A1 | 5/2016 | Kahtava et al. |
| 2016/0219639 A1* | 7/2016 | Agiwal ................. H04W 76/14 |
| 2016/0295633 A1 | 10/2016 | Baligh et al. |
| 2016/0309414 A1 | 10/2016 | Matsumoto |
| 2016/0330740 A1* | 11/2016 | Uchino ............... H04W 74/006 |
| 2016/0374068 A1 | 12/2016 | Kim et al. |
| 2017/0013647 A1* | 1/2017 | Uchino .................. H04W 74/08 |
| 2017/0311181 A1 | 10/2017 | Furuichi et al. |
| 2017/0367040 A1 | 12/2017 | Sakai et al. |
| 2018/0206288 A1* | 7/2018 | Pelletier ................ H04W 76/27 |
| 2018/0302868 A1* | 10/2018 | Bhorkar ............ H04W 56/0005 |

FOREIGN PATENT DOCUMENTS

| | | |
|---|---|---|
| JP | 2008193365 A | 8/2008 |
| JP | 2014522214 A | 8/2014 |
| JP | 2014529958 A | 11/2014 |
| KR | 20060040541 A | 5/2006 |
| WO | 2015077619 A1 | 5/2015 |

\* cited by examiner

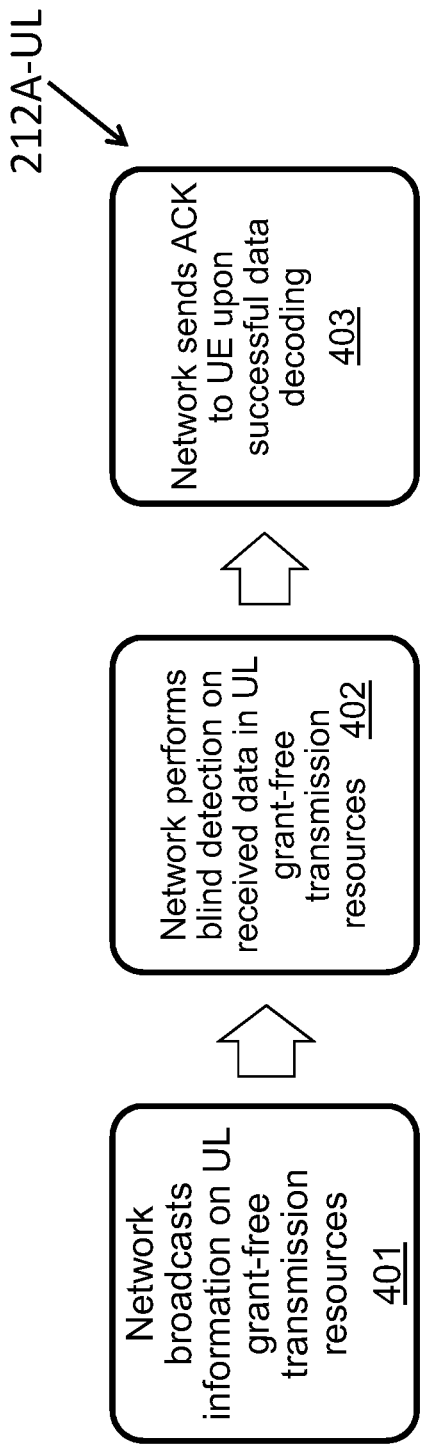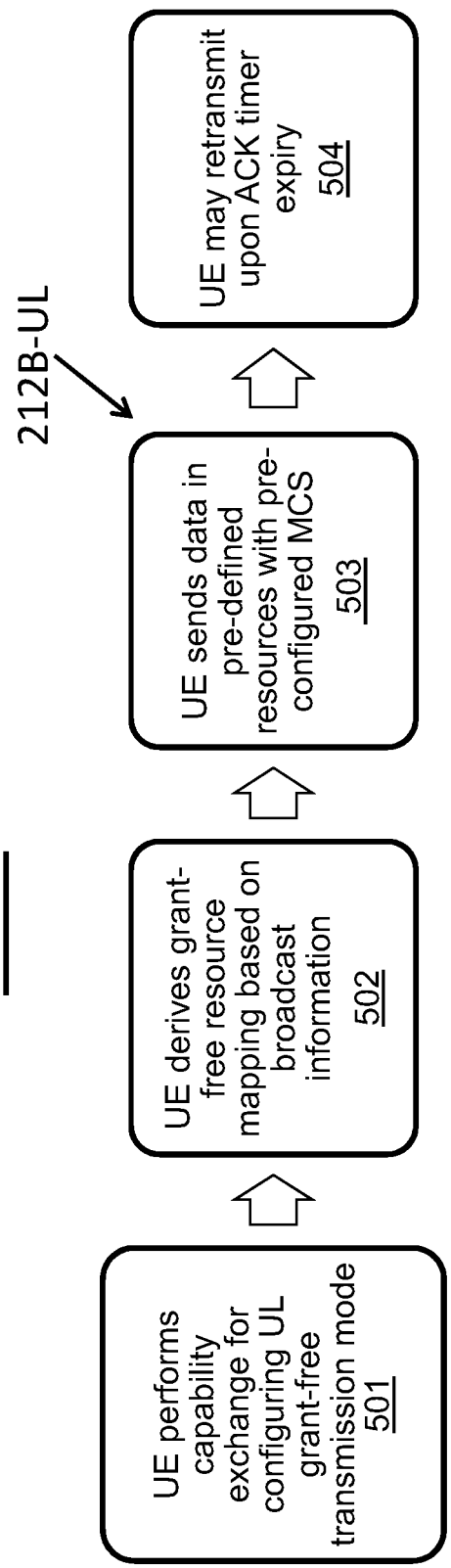
FIG. 4
FIG. 5

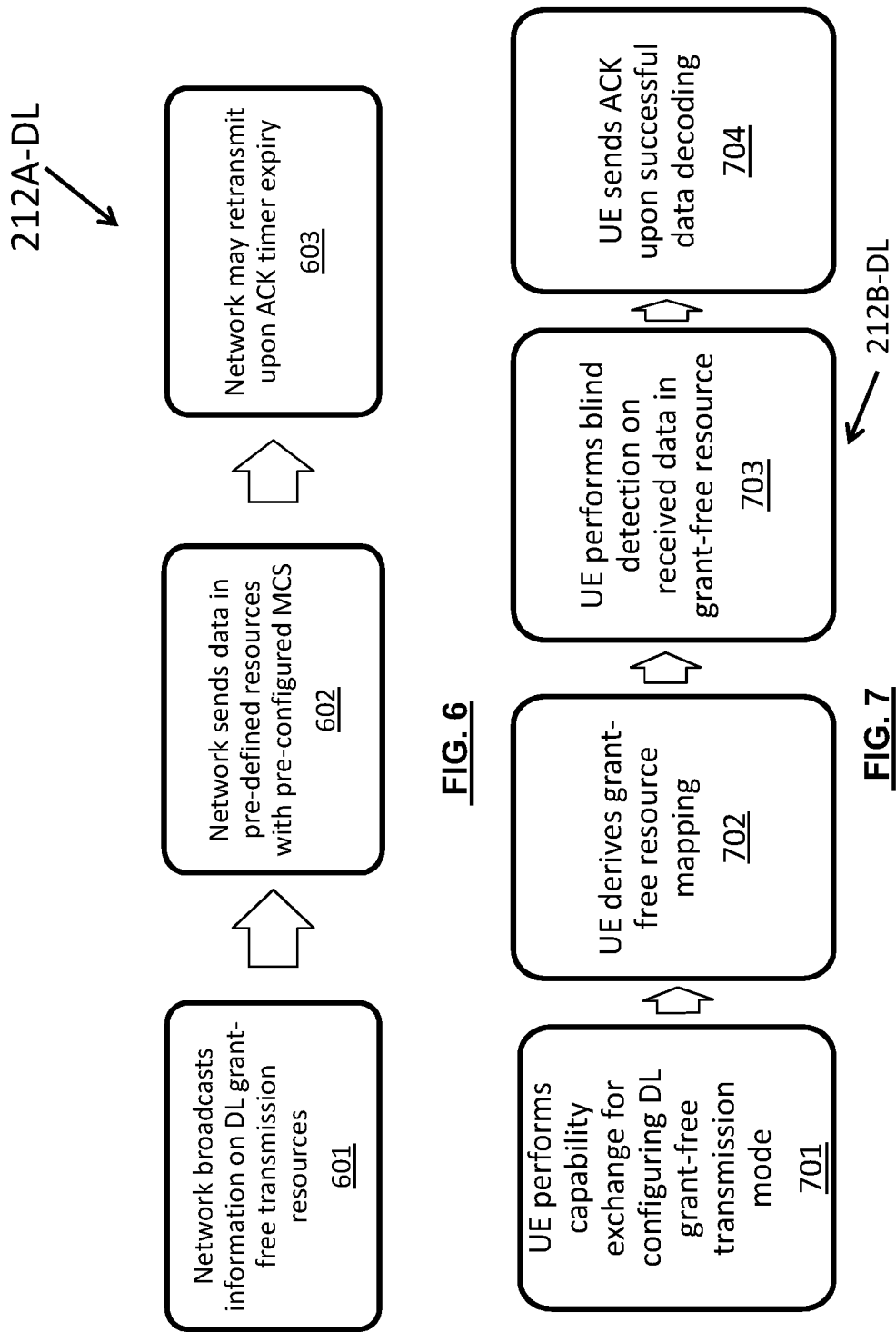

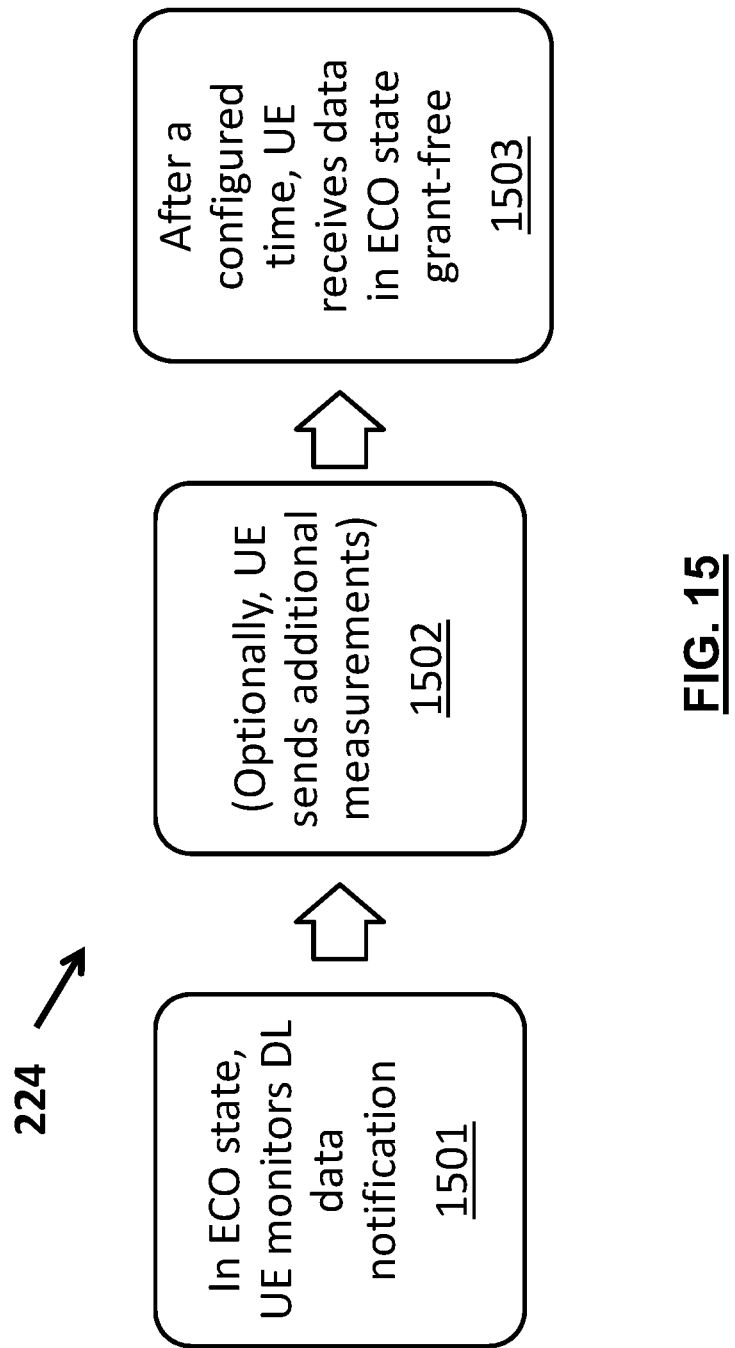

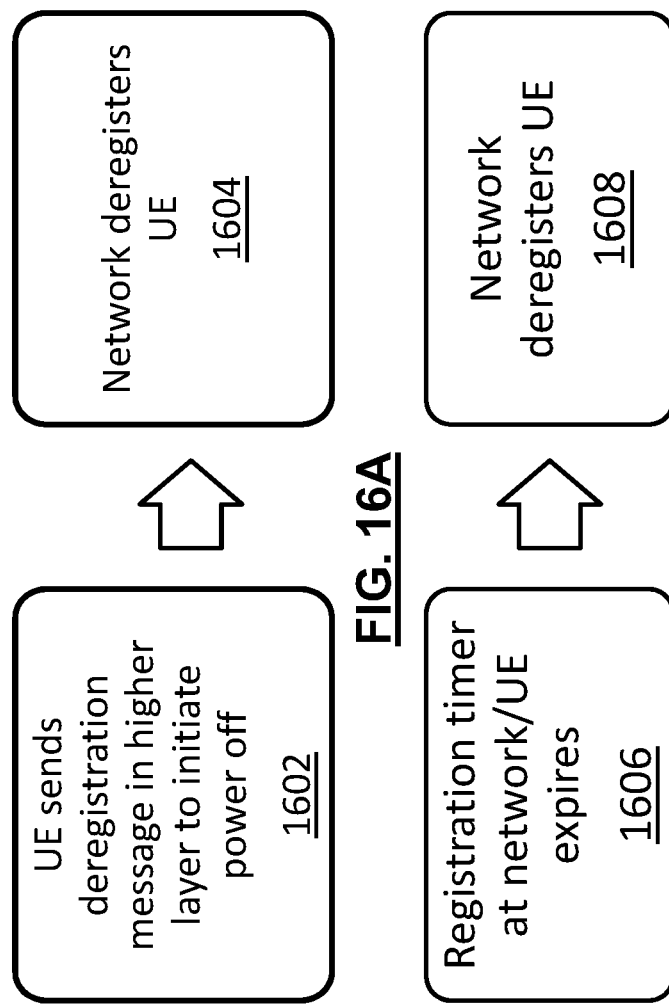

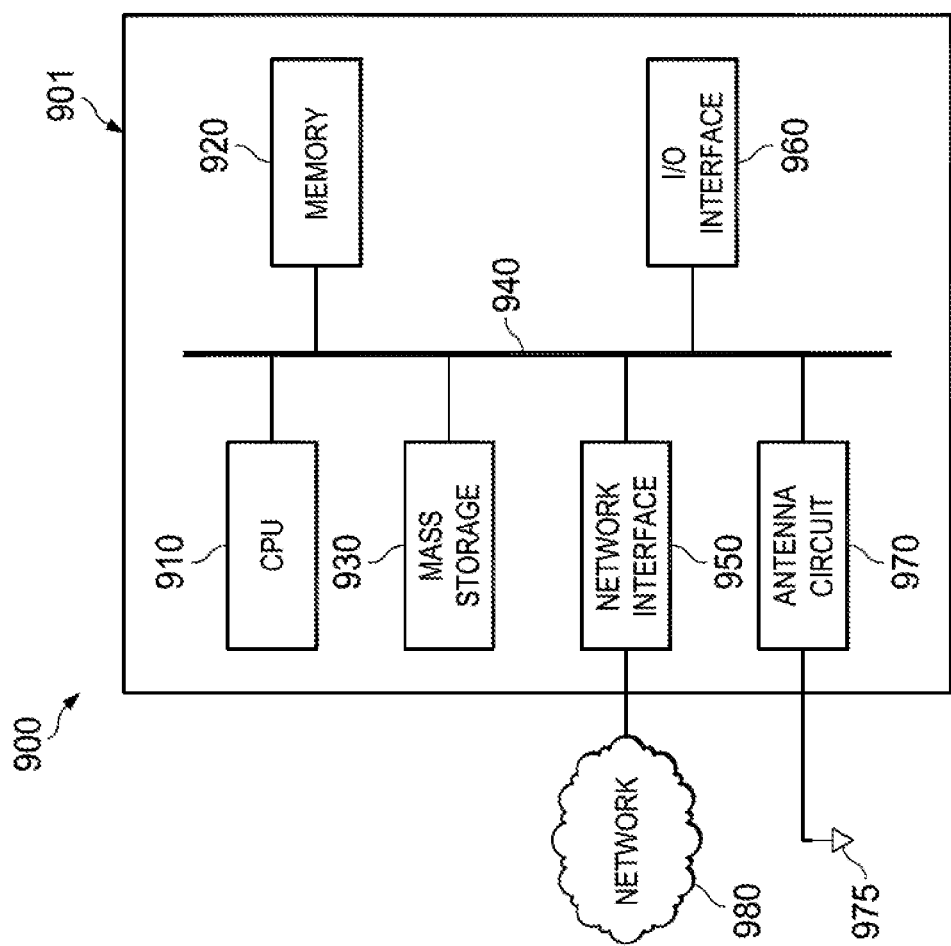

SYSTEM AND METHOD OF UE-CENTRIC RADIO ACCESS PROCEDURE

RELATED APPLICATIONS

This application is a continuation of U.S. patent application Ser. No. 15/165,985, filed May 26, 2016; which claims the benefit of priority to U.S. Provisional Patent Application Ser. No. 62/168,658, filed May 29, 2015; the contents of both of which are incorporated herein by reference.

FIELD

The present disclosure relates to a system and method for wireless communications, and in particular, to a system and method for user equipment centric radio access procedures.

BACKGROUND

Wireless networks that support mobile user equipment (UE) are generally cellular in nature. The Radio Access Network (RAN) of a wireless network provides radio access to a UE using a plurality of base stations that each have a corresponding coverage area, also known as a coverage cell or cell. Each base station supports communications the UEs within its corresponding cell. Each UE is assigned a cell-specific ID which is locally unique. The performance of cell-centric networks is limited by factors such as inter-cell interference and non-uniform spectral efficiency across a cell.

SUMMARY

Wireless networks may employ radio access virtualization (RAV) that will eliminate traditional cell boundaries in favor of user equipment (UE) centric resource assignment. RAV can include a number of different components that will use different procedures in different UE operational states. Example embodiments are described herein for supporting selected RAV procedures in various UE states. In example embodiments there is described a method and system for operating a UE wherein a first set of radio access procedures are supported when the UE is in a first operating state; and a second set of radio access procedures are supported when the UE is in a second operating state. According to one example aspect is a method for operating a user equipment device that is enabled to transition between at least a first operating state that supports a first set of radio access procedures and a second operating state that supports a second set of radio access procedures. The method includes performing an initial access procedure, while the user equipment device is in the first operating state, to establish a first set of radio access parameters for the user equipment device to use while in the first operating state and a second set of radio access parameters for the user equipment device to use while in the second operating state. The method further includes transitioning from the first operating state to the second operating state and transmitting using the second set of radio access parameters.

In some example configurations, establishing the first and second sets of radio access parameters includes receiving the first and second sets of radio access parameters at the user equipment device from a wireless network entity. In some examples, the radio access parameters include a user equipment identifier for the user equipment device to use in both the first operating state and the second operating state. In some configurations, the first set of radio access parameters includes a user equipment sounding reference signal and a sounding channel resource assignment for the user equipment device, and the second set of radio access parameters includes a user equipment identifying sequence and an uplink tracking channel resource assignment for the user equipment device.

In some examples the method includes periodically transmitting from the user equipment device, while in the first operating state, the user equipment sounding reference signal using the sounding channel resource assignment, and transmitting from the user equipment device, while in the second operating state, the user equipment identifying sequence using the uplink tracking channel resource assignment. In some configurations, the periodic transmission of the user equipment identifying sequence requires less wireless network resources than the periodic transmitting of the user equipment sounding reference signal.

In some examples, the method includes monitoring, at the user equipment device, for downlink grant-free transmissions in both the first operating state and the second operating state. In some examples, the method includes sending, from the user equipment device, uplink grant free transmissions in both the first operating state and the second operating state.

In some examples, the method includes, at the user equipment device, transitioning from the second operating state to the first operating state upon receiving a message on a data downlink channel monitored by the user equipment device that there is downlink data for the user equipment device requiring that the user equipment device transition from the second operating state to the first operating state, and then receiving the downlink data while in the first operating state. In some examples, the message includes a unicast message that includes an identifier for the user equipment device and a flag indicating that a state transition is required.

In some examples aspects, a user equipment device for operating in a wireless network is configured to perform the above methods. For example, one aspect provides a user equipment device for operating in a wireless network, the user equipment device including a wireless network interface for sending and receiving radio frequency signals through the wireless network, a processor coupled to the wireless network interface, and a memory coupled to the processor. The memory stores executable instructions that, when executed by the processor, enable the user equipment device to: transition, upon the occurrence of predetermined events, between a first operating state that supports a first set of radio access procedures and a second operating state that supports a second set of radio access procedures; and perform an initial access procedure, while the user equipment device is in the first operating state, to establish a first set of radio access parameters for the user equipment device to use while in the first operating state and a second set of radio access parameters for the user equipment device to use while in the second operating state.

In some aspects, the user equipment device is configured to establish the first and second sets of radio access parameters by receiving the network access parameters at the user equipment device from a network entity through the wireless network. In some aspects, the radio access parameters includes a user equipment identifier for the user equipment device to use in both the first operating state and the second operating state. In some configurations, the first set of radio access parameters includes a user equipment sounding reference signal and a sounding channel resource assignment for the user equipment device, and the second set of radio access parameters includes a user equipment identifying sequence and an uplink tracking channel resource assignment for the user equipment device.

In some examples, the user equipment device is configured to: periodically transmit from the user equipment device, while in the first operating state, the user equipment sounding reference signal using the sounding channel resource assignment; and periodically transmit from the user equipment device, while in the second operating state, the user equipment identifying sequence using the uplink tracking channel resource assignment. The periodic transmission of the user equipment identifying sequence requires less wireless network resources than the periodic transmitting of the user equipment sounding reference signal.

In some examples, the user equipment device is configured to provide always on-connectivity through the wireless network interface in both the first and second operating states by: sending the user equipment sounding reference signal using the sounding channel resource assignment in the first operating state but not the second operating state; and sending the user equipment identifying sequence using the uplink tracking channel resource assignment while in the second operating state; support grant-free uplink and downlink transmissions for data below predefined thresholds in both the first operating state and the second operating state; and monitor a downlink data notification channel while in the second operating state for an indication to transition to first operating state.

According to some example aspects is a network element for operating in a wireless network. The network element includes a wireless network interface for sending and receiving radio frequency signals through the wireless network to one or more user equipment devices; a processor coupled to the wireless network interface; and a memory coupled to the processor. The memory stores executable instructions that, when executed by the processor, enable the network element to: perform an initial access procedure to provide network access parameters to a user equipment device that is operating in a first operating state, the network access parameters including: a user equipment identifying sequence and an uplink tracking channel resource assignment for the user equipment device to use while in a second cooperating state; and a user equipment sounding reference signal and a sounding channel resource assignment for the user equipment device to use while in the first operating state.

BRIEF DESCRIPTION OF THE DRAWINGS

Reference will now be made, by way of example, to the accompanying drawings which show example embodiments of the present disclosure, and in which:

FIG. 4 is a block diagram that illustrates an example of a network side actions enabled by a network controller for Uplink (UL) grant-free transmissions in multiple operating states.

FIG. 5 is a block diagram that illustrates an example of the actions performed by User Equipment (UE) for UL grant-free transmissions in multiple operating states.

FIG. 6 is a block diagram that illustrates an example of network side actions enabled by the network controller for downlink (DL) grant-free transmissions in multiple operating states.

FIG. 7 is a block diagram that illustrates an example of the actions performed by UE for DL grant-free transmissions in multiple operating states.

FIG. 15 is a block diagram that illustrates an example of a DL Data notification procedure performed when the UE is in the second (ECO) state.

FIG. 16A illustrates a block diagram that shows a power-off deregistration procedure.

FIG. 16B illustrates a block diagram that shows a registration timer expiry deregistration procedure.

FIG. 17 is a block diagram of a processing system that may be used for implementing devices in the system of FIG. 1 according to example embodiments.

Similar reference numerals may have been used in different figures to denote similar components.

DESCRIPTION OF EXAMPLE EMBODIMENTS

Figure 1:
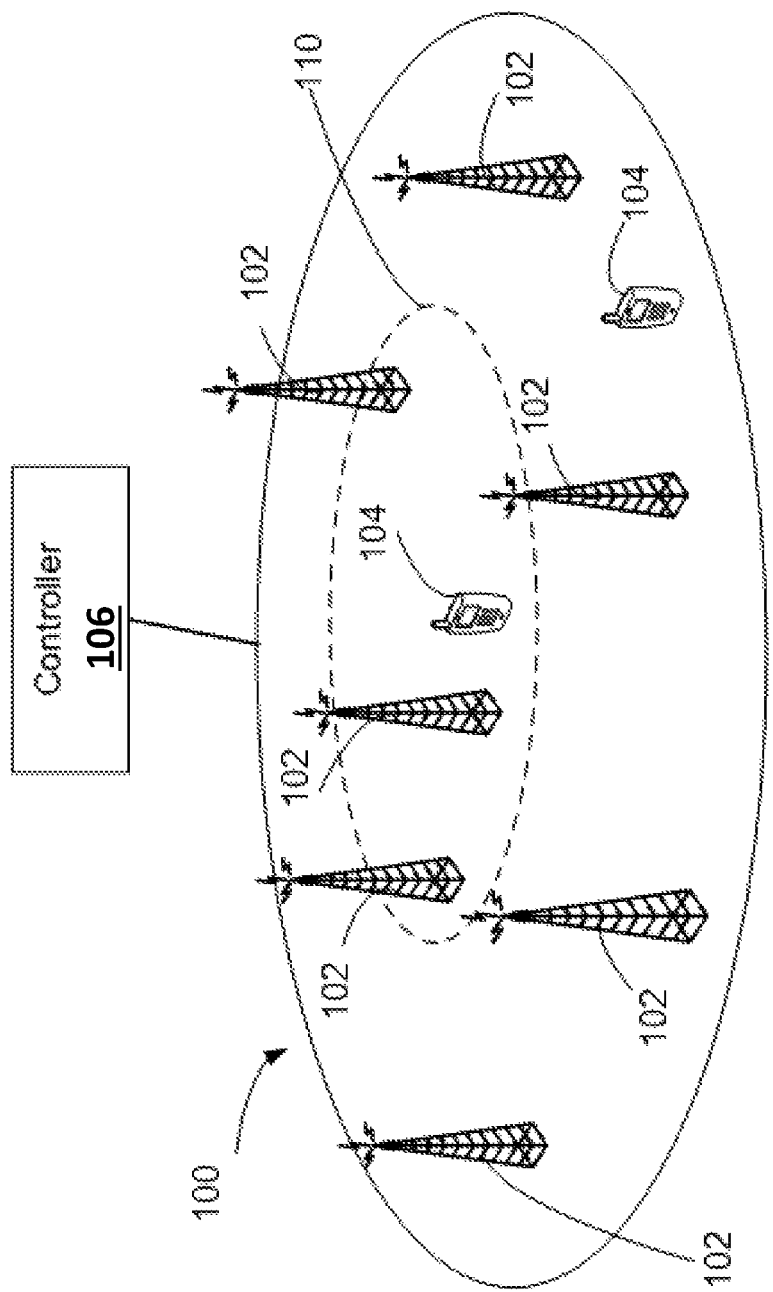
FIG. 1 illustrates an example of a UE-centric wireless communications system according to example embodiments.

FIG. 1 illustrates a wireless communications network 100 to which the radio access procedures described herein can be applied. Systems and methodologies for implementing UE-centric communications networks can be found, for example, in the disclosures of the following documents, the contents of which are incorporated herein by reference: (1) U.S. patent application Ser. No. 14/550,362 filed Nov. 21, 2014 (publication number US 2015/0141002 A1), entitled: "System and Method for Non-cellular Wireless Access"; (2) U.S. patent application Ser. No. 13/974,810 filed Aug. 23, 2013 (publication number US 2014/0113643 A1), entitled "System and Method for Radio Access Virtualization"; (3) U.S. patent application Ser. No. 13/930,908 filed Jun. 28, 2013 (publication number US 2015/0003263 A1), entitled "System and Method for Network Uplink Measurement Based Operation Using UE Centric Sounding"; (4) U.S. patent application Ser. No. 14/150,539 filed Jan. 8, 2014, entitled "System and Method for Always On Connections in Wireless Communications System" (publication number US2015/0195788 A1)); (5) U.S. Patent Application Nos. 62/141,483 filed Apr. 1, 2015, and Ser. No. 15/009,626 filed Jan. 28, 2016 entitled "System and Method for a Tracking Channel"; (6) U.S. patent application Ser. No. 13/608,653 filed Sep. 10, 2012 (publication number US 20140073287 A1), entitled "System And Method For User Equipment Centric Unified System Access In Virtual Radio Access Network"; (7) U.S. patent application Ser. No. 14/609,707 filed Jan. 30, 2015, entitled "Apparatus And Method For a Wireless Device To Receive Data in an Eco State"; (8) U.S. patent application Ser. No. 13/911,716 filed Jun. 6, 2013 (publication number US 2014/0192767 A1), entitled "System and Method for Small Traffic Transmissions"; and (9) "U.S. patent application Ser. No. 13/790,673 filed Mar. 8, 2013, (publication number US 2014/0254544 A1) System and Method for Uplink Grant-Free Transmission Scheme".

As described in the documents noted above, in example embodiments UE-centric wireless communications network 100 organizes network communications around a user equipment dedicated connection ID (UE DCID) associated with a User Equipment (UE) device. In this regard, wireless communications network 100 employs an air interface design to support non-cellular based wireless access.

In an example embodiment, wireless communications network 100 of FIG. 1 includes a plurality of transmission reception points (TRPs) 102 and UEs 104, and a cloud processor or controller 106 in communication with the TRPs 102. The TRPs 102 may include any component capable of providing wireless access by establishing uplink and/or downlink connections with the UEs 104, such as a base transceiver station (BTS), a NodeB, an evolved NodeB (eNodeB or eNB), a femtocell, and other wirelessly enabled network node devices. The UEs 104 may comprise any component capable of establishing a wireless connection with the TRPs 102. The TRPs 102 may be connected to controller 106 via a backhaul network (not shown). The backhaul network may be any component or collection of components that allow data to be exchanged between the TRPs 102 and the controller 106 and/or a remote end (not shown). In some embodiments, the wireless communications network 100 may comprise various other wireless devices, such as relays, femtocells, etc. The controller 106 may be any type of data processing system capable of performing the processes disclosed below and capable of communication with other devices.

In one example of wireless communications network 100, the TRPs 102 are not associated with a cell. Rather, the controller 106 organizes the TRPs 102 into logical entities 110. Each UE 104 is assigned to a logical entity 110 and is assigned a unique UE dedicated connection ID (UE DCID). In an embodiment, the UE 104 can be a mobile phone, a sensor, a smart phone, or other wireless device. The UE 104 may move freely within a service area of a single logical entity 110 without acquiring a new UE DCID. Each TRP 102 monitors signal strengths for any UE 104 detectable by the TRP 102 and sends this data to the controller 106. Controller 106 can both create and manage the membership of logical entity 110. When a UE 104 initially attaches to the network, controller 106 can create logical entity 110 and assign a set of TRPs 102 to logical entity 110. This assignment can be done in accordance with measurements of the received strength of the UE transmission at the TRP 102. As the conditions in the network change, or as the UE moves through the network, controller 106 can modify the membership of logical entity 110. This determination can be performed dynamically in some embodiments. In some examples, the controller 106 assigns a logical entity ID to the logical entity 110 and assigns a UE DCID to each UE 104 according to the logical entity ID to which the UE 104 is assigned and a user equipment identifier (UE ID) of the UE 104. In some embodiments, the UE ID is a unique identifier permanently or semi-permanently assigned to a device, for example when the UE device is manufactured, or delivered to a network operator, or assigned to a user. In some examples, the UE DCID is a combination of the UE ID and the logical entity ID.

The UE DCID is used by the UE 104 when transmitting, and may also be used when receiving. In some examples, the controller 106 selects one or more of the TRPs 102 from the group of TRPs 102 in the logical entity 110 to provide radio access to the UE 104. In an embodiment, the controller 106 selects the TRP 102 based on relative signal strengths of the UE 104 at each of the TRPs 102 in the logical entity 110 and/or the loads of each TRP 102 in the logical entity 110. In other embodiments, other selection criteria can be utilized. In an embodiment, the controller 106 dynamically reassigns a new TRP 102 in the logical entity 110 to serve the UE 104 based on changes to the signal strength of the 104 UE at each TRP 102 in the logical entity 110. The change in signal strength may be due to UE mobility or to other factors.

In an embodiment, the controller 106 can enable or disable the participation of one or more TRPs 102 in a logical entity 110 to reach a tradeoff between the service quality provided to all covered UEs 104 and energy saving criteria.

In an embodiment, the TRPs 102 assigned to a logical entity 110 may be changed dynamically by the controller 106 according to changes in network conditions.

Figure 2:
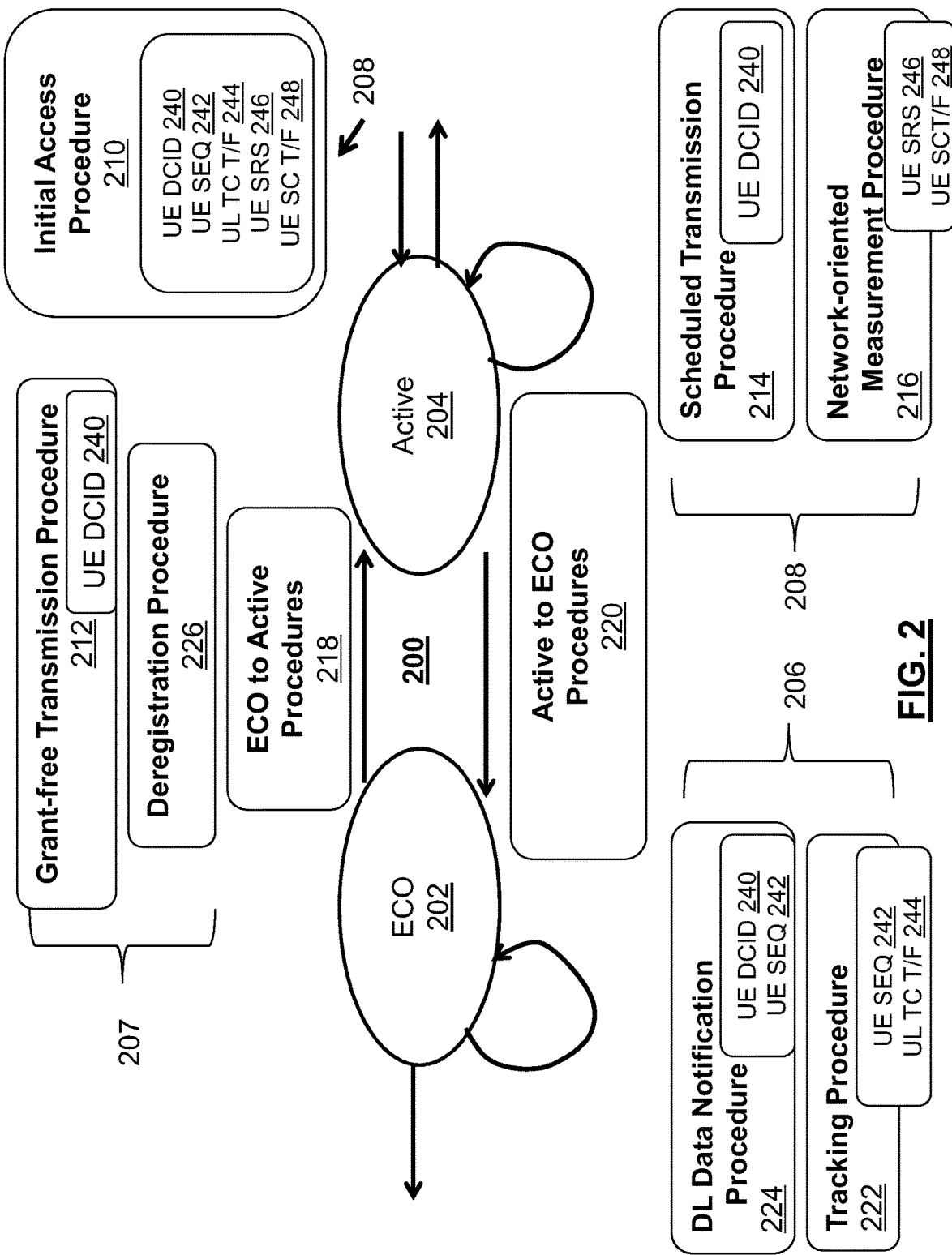
FIG. 2 is a block diagram that illustrates different user equipment operating states and the functions and procedures associated with those states according to example embodiments.

In example embodiments, the wireless communications network 100 is configured to support different operating states for UE 104, with each operating state supporting different UE functionality. In this regard, FIG. 2 is a block diagram that illustrates different UE 104 operating states and the functions and procedures associated with those states according to example embodiments. In particular, in one example the UE 104 is configured to implement a state machine 200 that can transition between two different states, namely a first "Active" state 204 and a second, energy economizing, "ECO" state 202. In example embodiments, a reduced set of UE functionality is supported in the ECO state 202 compared to the Active state. At least some degree of connectivity to wireless communications network 100 is supported in both states, such that UE 104 maintains an always-on connection to the wireless communications network 100. Examples of the implementation of state machine 200 on UE 104 are described in detail in the aforementioned documents entitled "System and Method for Always On Connections in Wireless Communications System" publication number US2015/0195788 A1 and "Apparatus And Method For a Wireless Device To Receive Data in an Eco State" U.S. patent application Ser. No. 14/609,707. In example embodiments, more than two operational states can be supported, with each state providing a different level of device functionality and requiring different levels of network resources.

In the example of FIG. 2, a first set of radio or network access functions or procedures, referred to herein as Active procedures 208, is supported in Active state 204 and a second set of radio or network access functions or procedures, referred to herein as ECO procedures 206, is supported in ECO state 202. As will be explained in greater detail below, in at least some embodiments some common procedures 207 are supported in both states, however some procedures are exclusive to one or the other of the Active state 204 or the ECO state 202. Furthermore, the procedures shown in FIG. 2 are not an exhaustive list of all the functionality supported in either state.

In the illustrated embodiment, the following Active procedures 208 are supported exclusively in the Active state 204:

Initial Access Procedures 210
Scheduled Transmission Procedure 214
Network-oriented Measurement Procedure 216

In the illustrated embodiment, the following ECO procedures 206 are supported exclusively in the ECO state 202:

Down Link (DL) Data Notification Procedure 224
Tracking Procedure 222

In the illustrated embodiment, the following common procedures 207 are supported in both the Active state 204 and the ECO state 202:

Grant-free Transmission Procedure 212
Deregistration Procedure 226

In the illustrated Embodiment, the following procedures enable transition between the Active State 204 and the ECO state 201:

ECO to Active Procedures 218
Active to ECO Procedures 220

Each of the above procedures will now be explained in greater detail with reference to FIGS. 3-16.

Figure 3:
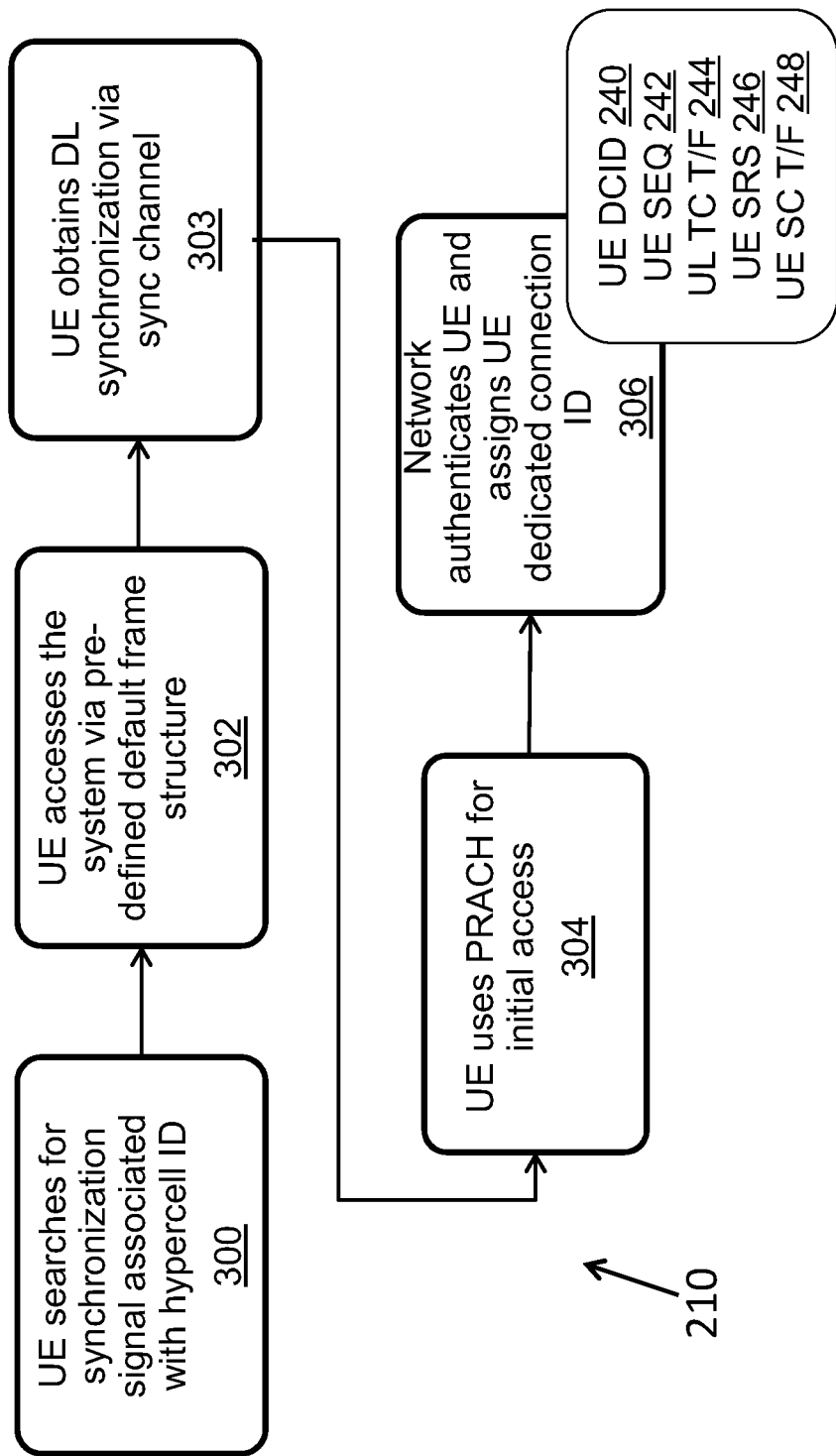
FIG. 3 is a block diagram that illustrates an example of an initial access procedure that is supported in an active state according to example embodiments.

FIG. 3 illustrates an example of an initial access procedure 210 that is supported by UE 104 in the Active state 204. Initial access procedure 210 will be performed when UE 104 is attempting to establish contact with the wireless communications network 100, for example when the UE 104 is being powered on. Initial access procedure 210 is used to establish sets of network access parameters that will be used by UE 104 in various operating states. Aspects of suitable initial access procedures are described in detail in the aforementioned documents (see for example U.S. patent application Ser. No. 14/550,362 filed Nov. 21, 2014 (publication number US 2015/0141002 A1), entitled: "System and Method for Non-cellular Wireless Access"; and U.S. patent application Ser. No. 13/974,810 filed Aug. 23, 2013 (publication number US 2014/0113643 A1), entitled "System and Method for Radio Access Virtualization"). Accordingly FIG. 3 and the accompanying description provide a high level overview.

As shown in FIG. 3, initial access procedure 210 includes the following actions: UE 104 searches for a synchronization signal associated with a TRP 102 (Hypercell ID) (Action 300); UE 104 accesses the wireless communications network 100 via a pre-defined default frame structure (Action 302); UE 104 obtains DL synchronization via a synchronization (sync) channel (Action 303); UE 104 uses Physical Random Access Channel (PRACH) for initial access (Action 304); and the network authenticates UE 104 and assigns a UE dedicated connection ID (UE DCID). More particularly, with respect to Actions 300 to 303, in example embodiments, one or more TRPs 102 assigned to a logical entity 110 transmit a DL synchronization signal in the sync channel using a pre-defined time and frequency (t/f) resource and frame structure. UE 104, as part of its initial access procedure, searches for the synchronization signal. The UE 104 can search in the pre-defined t/f resources for a synchronization signal having the predefined frame structure. After synchronization is established, the UE 104 can establish DL timing and frequency synchronization with the logical entity 110, and obtain an ID for logical entity 110. This information allows UE 104 to determine the correct PRACH t/f resources for UE 104 to transmit a UL sequence to the logical entity 110. The logical entity can respond with a UL timing adjustment command to the UE 104, thus allowing UL synchronization to be established with the network (Action 304). Once DL and UL synchronization have been established, the network controller 106 can authenticate UE 104 and assign: (a) a UE dedicated connection ID (UE DCID 240); (b) an associated UE-centric sequence (UE SEQ 242), which is a uniquely assigned ID sequence that the UE can transmit for low resource signaling in a tracking channel, such as a specific Zadoff-Chu sequence; (c) an uplink (UL) time/frequency (t/f) resource allocation for the tracking channel for the UE (UE TC T/F 244); and (d) sounding resources including a UE-centric sounding reference signal (UE SRS 246) and an uplink (UL) time/frequency resource allocation for a UL sounding channel (UE SC T/F 248). UE SRS 246 is an identifying signal that the UE can transmit for signaling to provide measurement information to the network in an UL sounding channel using the UL sounding channel time/frequency resource allocation UE SC T/F 248.

At the conclusion of initial access procedure 210, the UE 104 is provided with a Hypercell ID (i.e. an ID for logical entity 110), a UE dedicated connection ID (UE DCID 240), a UE-centric sequence (UE SEQ 242), an uplink tracking resource allocation (UL TC T/F 244), a UE-centric sounding reference signal (UE SRS 246) and a sounding channel resource allocation UE SC T/F 248). As will be explained in greater detail below and as illustrated in FIG. 2, the UE DCID 240 is used across a number of Active procedures 208, ECO procedures 206 and common procedures 207. In example embodiments, the UE sequence (UE SEQ 242) and Uplink tracking channel resource (UL TC T/F 244) assignments are used primarily in the ECO state 202, and the UE sounding reference signal (UE SRS 246) assignment and sounding channel resource (UE SC T/F 248) assignments are used primarily in the Active state 204. In some embodiments, the UE sequence (UE SEQ 242) and Uplink tracking channel resource (UL TC T/F 244) assignments are used exclusively in the ECO state 202, and the UE sounding reference signal (UE SRS 246) and sounding channel resource (UE SC T/F 248) assignments are used exclusively in the Active state 204.

As noted above, a grant-free transmission procedure 212 can be supported in both Active state 204 and ECO state 202. Such a procedure may, for example, be useful for small packet transmissions with low dynamic signaling overhead. The controller 106 identifies or determines the traffic types that are suitable for grant-free transmission. FIGS. 4, 5, 6, and 7 illustrate a set of functions that are part of grant-free transmission procedure 212. Aspects of suitable grant-free transmission procedures are described in detail in one or more of the aforementioned documents—see for example U.S. patent application Ser. No. 13/911,716 filed Jun. 6, 2013 (publication number US 2014/0192767 A1), entitled "System and Method for Small Traffic Transmissions" and U.S. patent application Ser. No. 13/790,673 filed Mar. 8, 2013, (publication number US 2014/0254544 A1) entitled "System and Method for Uplink Grant-Free Transmission Scheme". Accordingly, FIGS. 4-7 and the accompanying description provide a high level overview. In example embodiments, the UE DCID 240 is used in both grant-free uplink and downlink communications to identify the target UE 104 (in the case of a downlink transmission) or identify the sending UE (in the case of an uplink transmission). A shared grant-free uplink data channel and a shared grant-free downlink data channel can be used by multiple UEs, each of which may be in an Active state or an ECO state, to communicate with a network entity 110.

FIG. 4 illustrates network side actions 212A-UL enabled by the controller 108 for grant-free UL transmissions, including the following: logical entities 110 broadcast information about radio resources for UL grant-free transmission channel ("UL grant-free shared channel") (Action 401); controller 106/logical entities 110 perform blind detection on received data in UL grant-free transmission channel (Action 402); and controller 106 sends an acknowledgement message (ACK) through logical entity 110 to UE 104 upon successful data decoding (Action 403).

FIG. 5 illustrates the corresponding UE-side actions 212B-UL performed by UE 104 for UL grant-free transmissions, including: UE 104 performs capability exchange for configuring UL grant-free transmission mode (Action 501); UE 104 derives grant-free resource mapping based on broadcast information (Action 502); UE sends data (with a device identifier such as UE DCID 240) in pre-defined resources with pre-configured modulation and coding scheme (MCS) (Action 503); and UE may retransmit upon determination that the initial transmission failed, for example upon ACK timer expiry (Action 504).

FIG. 6 illustrates network side actions 212A-DL enabled by the controller 108 for DL grant-free transmissions, including the following: logical entities 110 broadcast information about DL grant-free transmission channel ("DL grant-free shared channel") (Action 601); controller 106/ logical entities 110 send data in pre-defined resources with pre-configured MCS (Action 602) (with target device identifier such as UE DCID 240 in the case of a downlink for a specified UE); and controller 106 may retransmit upon ACK timer expiry (Action 603).

FIG. 7 illustrates the corresponding UE-side actions 212B-DL performed by UE 104 for DL grant-free transmissions, including: UE 104 performs capability exchange for configuring DL grant-free transmission mode (Action 701); UE 104 derives grant-free resource mapping based on broadcast information (Action 702); UE 104 performs blind detection on received data in DL grant-free transmission channel (Action 703); and UE 104 sends ACK upon successful data decoding (Action 704).

Figure 8:
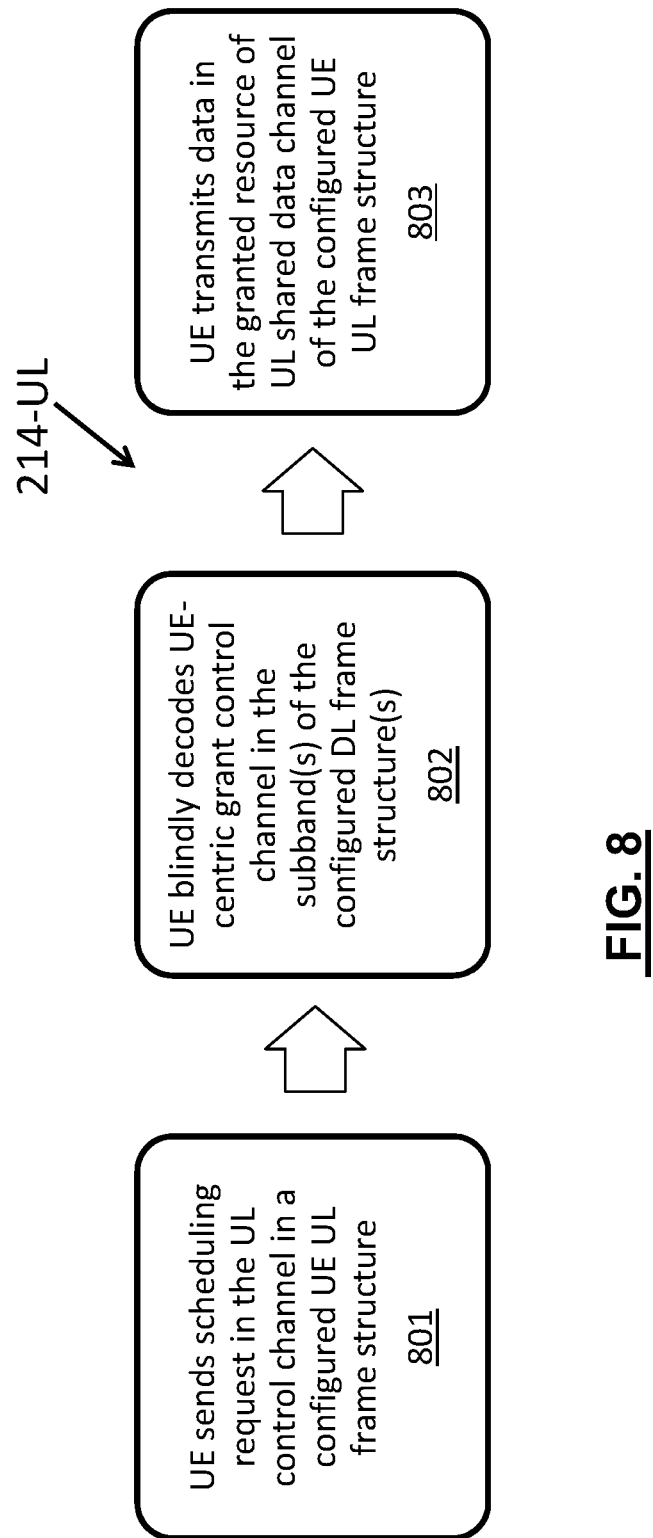
FIG. 8 is a block diagram that illustrates an example of UE functions that are performed by a UE for uplink communications in a first operating state.
Figure 9:
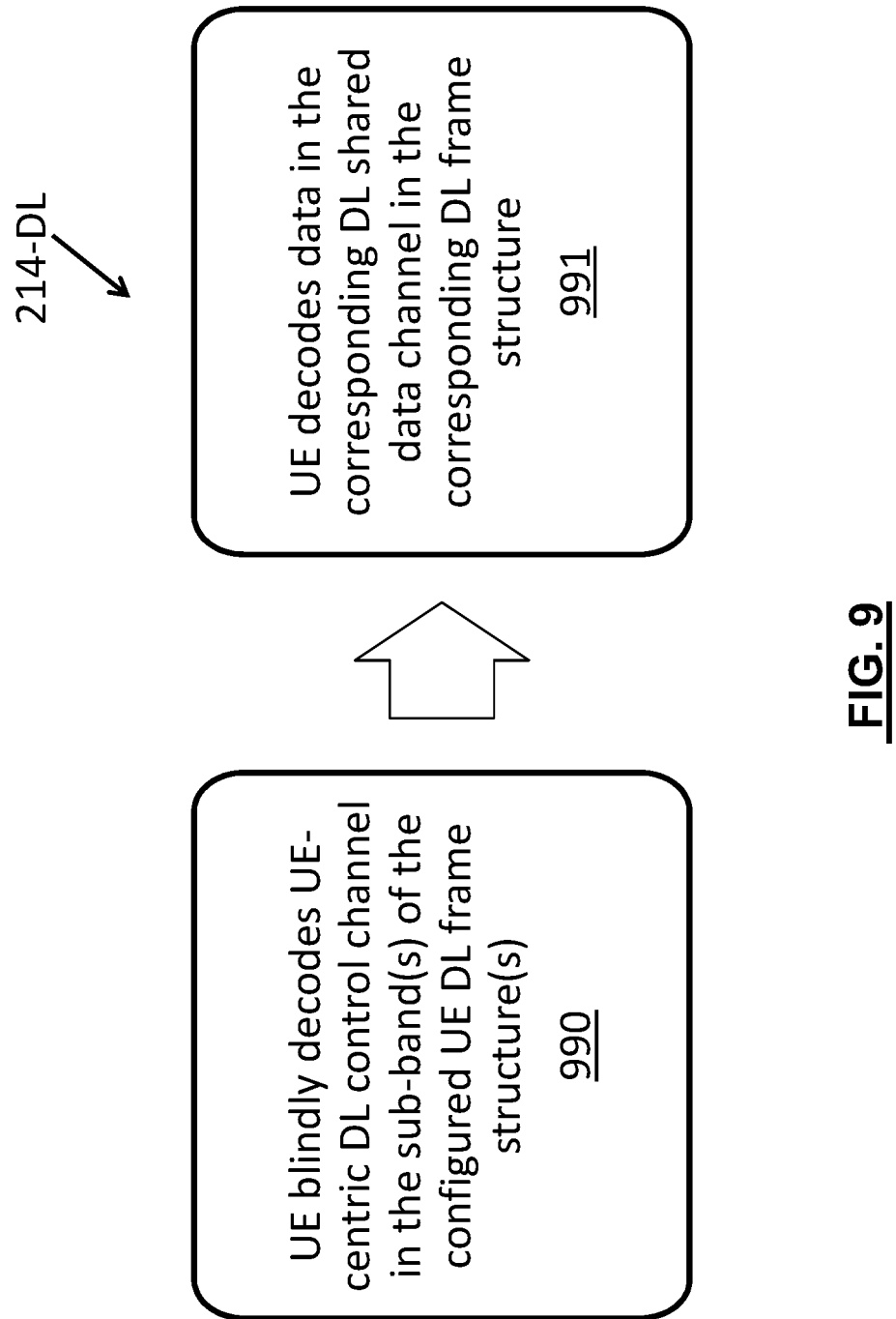
FIG. 9 is a block diagram that illustrates an example of UE functions that are performed by a UE for downlink communications in a first operating state.

As noted above, in example embodiments Scheduled Transmission Procedures 214 are only supported in the UE Active state 204. FIGS. 8 and 9 respectively illustrate UE functions 214-UL and 214-DL that are performed by UE 104 for uplink and downlink communications, respectively, as part of Scheduled Transmission Procedures 214. Scheduled transmission procedures are described in one or more of the documents identified above, and accordingly FIGS. 8 and 9 provide a summary. In an example embodiment, UL scheduled transmission occurs in an adaptive frame structure with filtered orthogonal frequency division multiplexing (f-OFDM), and UL grant information is sent via a control channel optimized to serve the UE 104. At UE 104, UL scheduled transmission includes the following actions: UE 104 sends scheduling request in the UL control channel in a configured UE UL frame structure (Action 801); UE 104 blindly decodes UE-centric grant control channel in the sub-band(s) of the configured DL frame structure(s) (Action 802); and UE transmits data in the granted resource of UL shared data channel of the configured UE UL frame structure (Action 803).

DL scheduled transmission also occurs in an adaptive frame structure with f-OFDM. DL grant information is sent via a UE-centric control channel optimized to serve the UE. As illustrated in FIG. 9, at UE 104, DL scheduled transmission includes the following actions: UE 104 blindly decodes UE-centric DL control channel in the sub-band(s) of the configured UE DL frame structure(s) (Action 990); and UE 104 decodes data in the corresponding DL shared data channel in the corresponding DL frame structure (Action 991).

Figure 10:
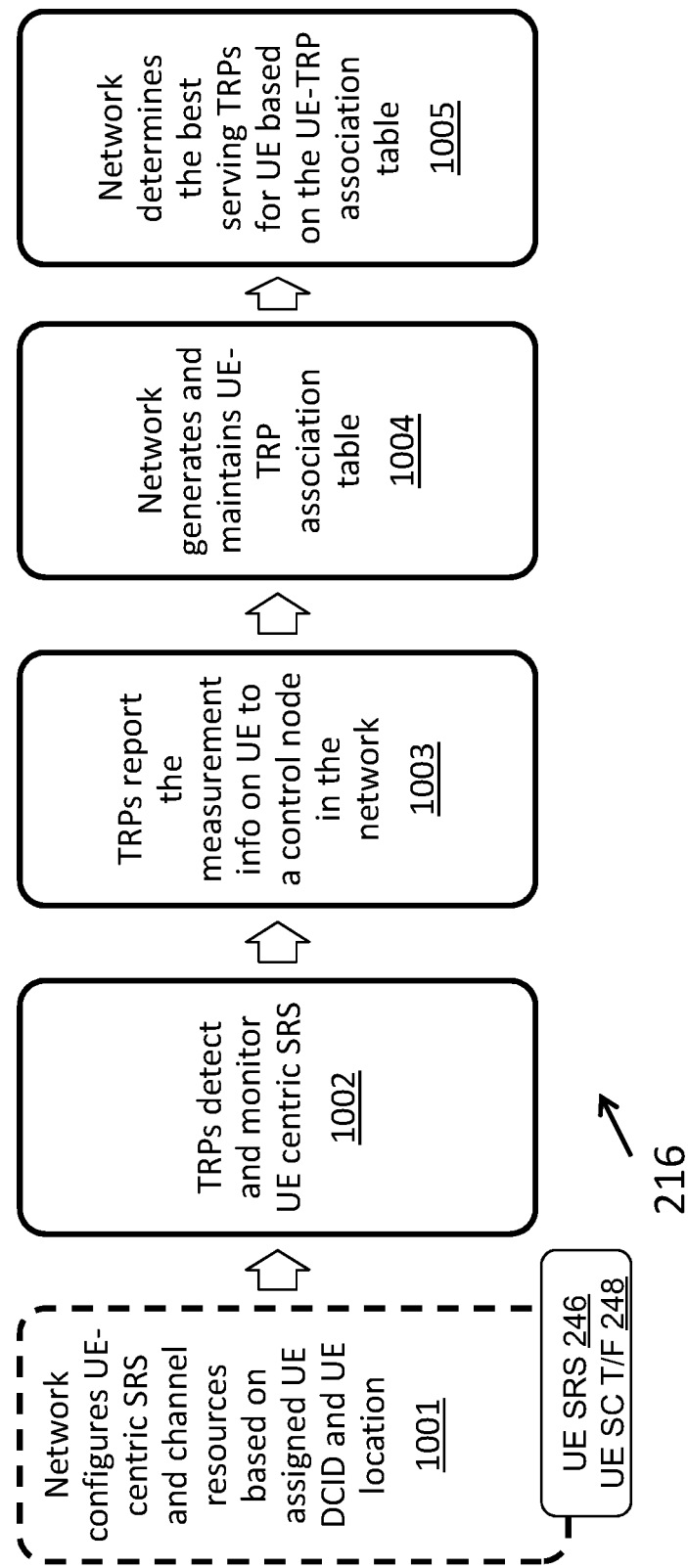
FIG. 10 is a block diagram that illustrates an example of Network-Oriented Measurement Procedures performed for a UE in the first operating state.

As noted above, in at least some embodiments Network-Oriented Measurement Procedures 216 are supported exclusively in Active state 204. Such procedures enable the controller 106 to dynamically and flexibly configure serving TRPs 102 for the UE 104. Aspects of suitable Network-Oriented Measurement Procedures 216 are described in detail in U.S. patent application Ser. No. 13/930,908 filed Jun. 28, 2013 (publication number US 2015/0003236 A1), entitled "System and Method for Network Uplink Measurement Based Operation Using UE Centric Sounding". FIG. 10 provides a summary of Network-Oriented Measurement Procedures 216, according to an example embodiment. UE 104 is assigned UE centric sounding reference signal (UE SRS) 246 and sounding radio resources UE SC T/F 248 upon initial access (Action 1001). In particular, this action is done as part of previously described Action 306 (FIG. 3) during initial access procedure 210. As part of Network-Oriented Measurement Procedure 216, UE sounding signals UE SRS 246 are received by multiple nearby transmit points (TPs) 102. DL and UL transmissions can be assisted by the UL measurements, and DL feedback requirements can be reduced. In this regard, as shown in FIG. 10, procedure 216 includes: Controller 106 configures UE-centric SRS (UE SRS 246) and channel resources (UE SC T/F 248) based on assigned UE dedicated connection ID and UE 104 location (Action 1001); TRPs 102 detect and monitor UE centric SRS UE SRS 246 (Action 1002—performed on an ongoing basis); TRPs 102 report measurement information for UEs 104 to a controller 106 (Action 1003); controller 106 generates and maintains UE-TRP association table (action 1004); and controller 106 determines the best serving TRPs 102 for UE 104 based on the UE-TRP association table. Action 1001 is performed as part of UE initial access; Actions 1001, 1003, 1004 and 1005 are performed by the network controller 106 on an ongoing basis for active-state UEs.

In some example embodiments, UE 104 is configured to transmit sounding resource signalling UE SRS 246 using the sounding channel resources UE SC T/F 248 exclusively while in Active state 202. However, in some example embodiments, UE 106 may provide the signalling required to support the measurement procedures 216 even in the ECO state 202.

Figure 11:
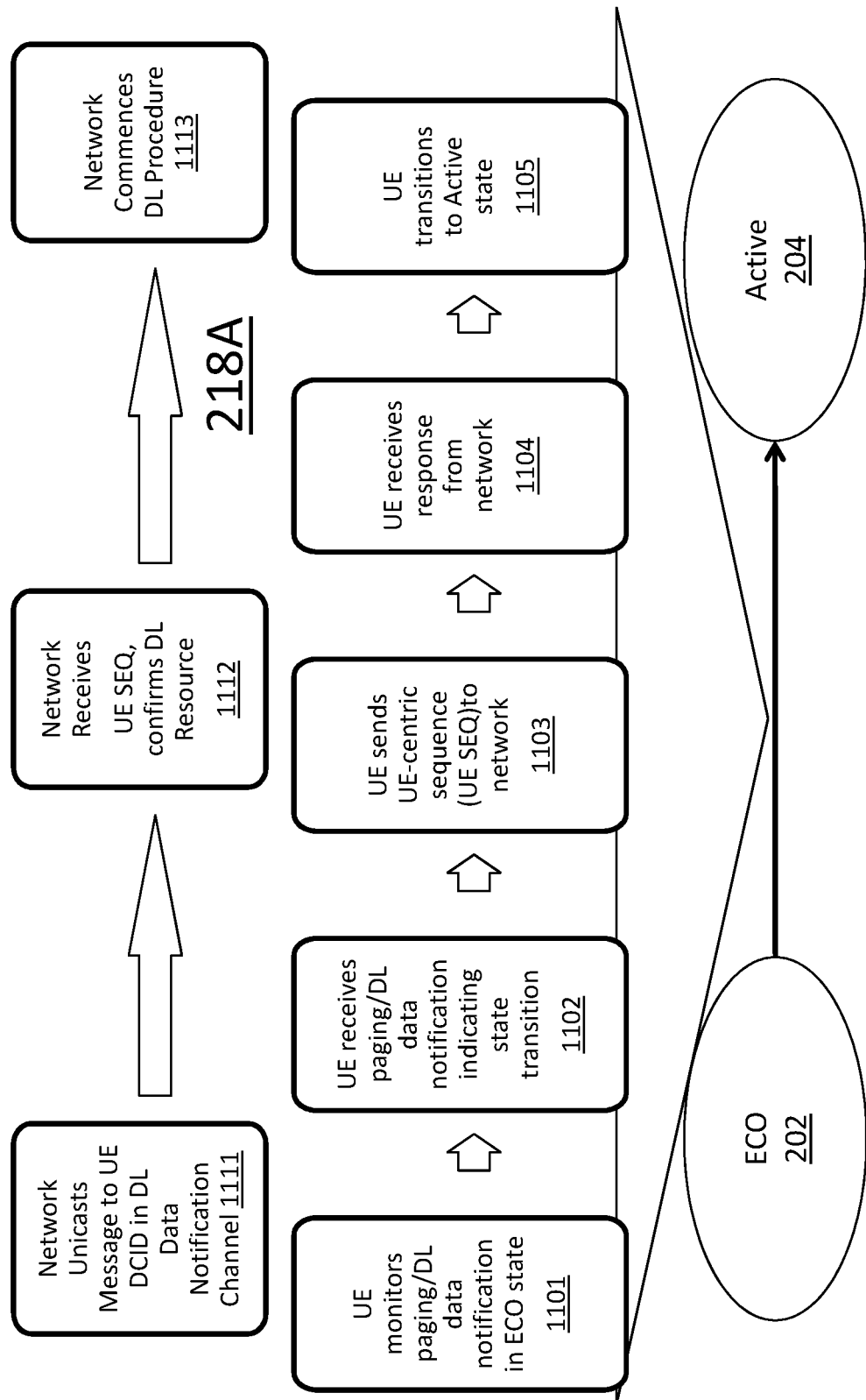
FIG. 11 is a block diagram that illustrates an example of a network initiated second (ECO) state to first (Active) state transition procedure for a UE.
Figure 12:
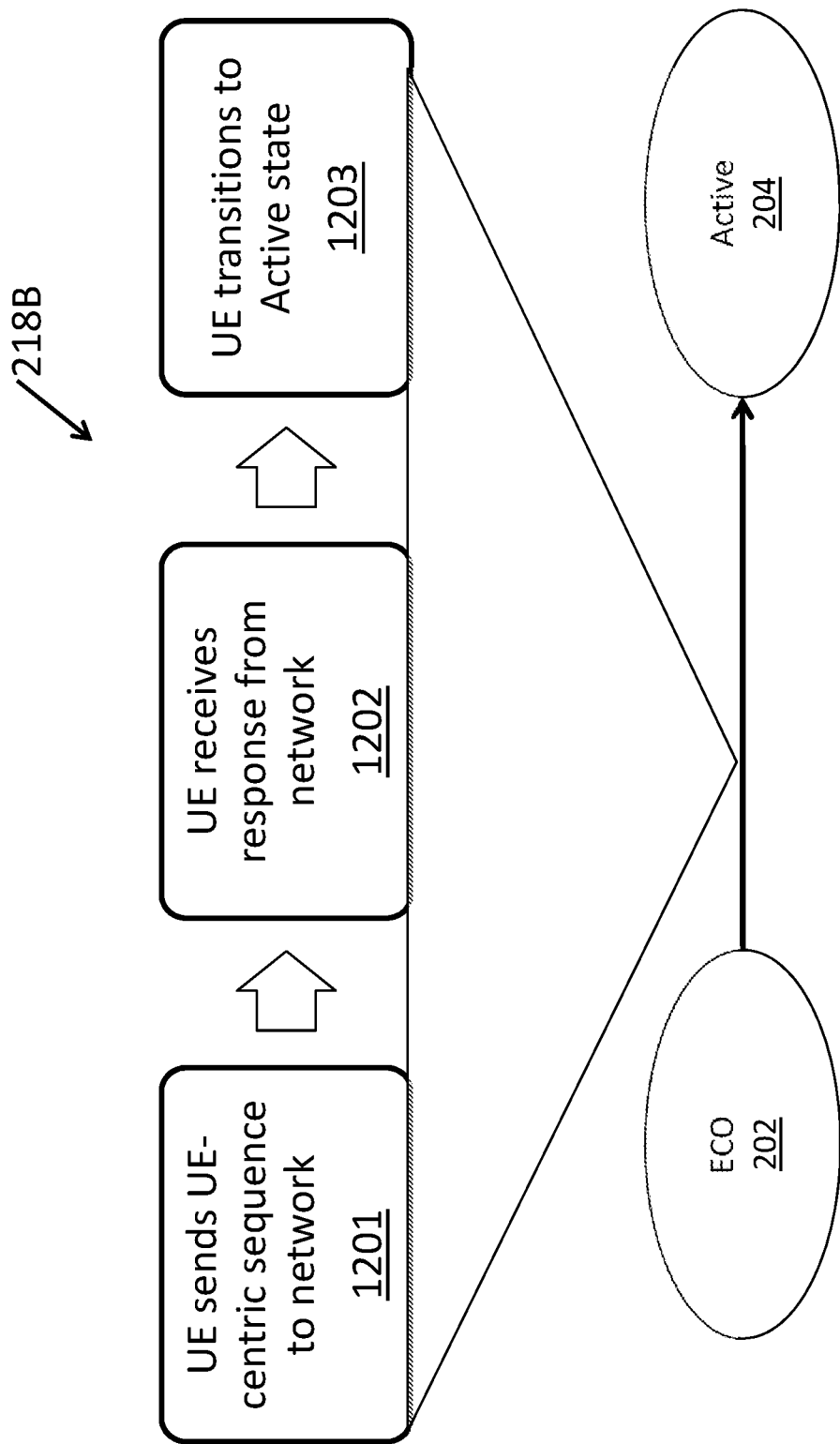
FIG. 12 is a block diagram that illustrates an example of a UE initiated second (ECO) state to first (Active) state transition procedure.

FIGS. 11 and 12 respectively illustrate a network initiated ECO to Active state transition procedure 218A and a UE initiated ECO to Active state transition procedure 218B. Examples of state transition procedures are described in detail in one or more of the documents identified above. In the illustrated example, state transition is contention free and uses a UE-centric sequence to reduce latency of the state transition.

In an example embodiment, network-initiated state transition procedure 218A from ECO to Active is triggered by a message from the network to the UE 104, while the UE 104 is in the ECO state, indicating that the network has downlink data to send to the UE 104. Such a notification may, for example, occur when the amount of downlink data exceeds the data that could efficiently be sent in a grant-free shared channel. In this regard, in example embodiments, wireless communications network 100 includes a low resource shared DL notification channel that can be used to send DL or paging notifications to UEs 104. In some embodiments, UE 104 could be informed of a DL notification channel assignment as part of the initial access procedure 210; alternatively, DL notification channel assignment could occur when a UE 104 goes into an ECO state; alternatively, DL notification channel assignment could be done as part of UE factory provisioning or at other times.

As shown in FIG. 11, in an example embodiment network-initiated state transition procedure 218A from ECO to Active includes Actions 1101-1105 performed at UE 104 and Actions 1111-1113 performed by network logical element 110 and network controller 106, as follows. UE 104 monitors the DL notification channel for a paging/DL data notification while the UE 104 is in ECO state (Action 1101). When the network controller 106 determines that it has downlink data for UE 104 that exceeds the capacity of the DL grant-free shared channel, the network controller 106 causes network logical element 110 to send a notification for UE 104 in the DL notification channel (Action 1111). In an example embodiment, the notification is addressed to the UE 104 using the UE DCID 240 (or an associated UE identifier that is a subset of the UE DCID such as the UE ID), and includes an indication that a transition to an Active state is required. In some embodiments, a flag or bit in the message could be set to indicate a state transition is required; in other examples, the indication is implicit in the message. UE 104 receives the paging/DL data notification message indicating state transition (Action 1102), and UE 104 sends UE-centric sequence (UE SEQ 242) to network logical element 110 for measurement purposes using a defined UL resource (Action 1103). In some embodiments, the UE SEQ 242 is sent in the UL tracking channel used in tracking procedure 222, discussed below. In some embodiments, the UE SEQ 242 transmission is sent specifically in response to the DL data notification messages, however in some embodiments UE SEQ 242 transmission is periodically sent as a tracking message to the network entity by UE 104 during the time the UE 104 is in the ECO state.

One or more TRPs in the logical entity 110 receives the UE SEQ 242 transmission. Network controller 106 uses the information (for example the signal strength) from the received UE SEQ signal to confirm the network resources available to be dedicated to send the downlink data, and causes a further message to be sent to UE 104 confirming that the transition to Active state should proceed (Action 1112); UE 104 receives the response from network logical element 110 (Action 1104) and then UE 104 transitions to Active state (Action 1105). Data downlink procedure 214-DL can then be implemented (Action 1113).

As shown in FIG. 12, UE-initiated state transition procedure 218B from ECO to Active includes the following: UE sends UE-centric sequence UE SEQ 242 to network logical element 110 (Action 1201); UE receives response from network logical element 110 (Action 1202); and UE transitions to Active state (Action 1203).

Figure 13:
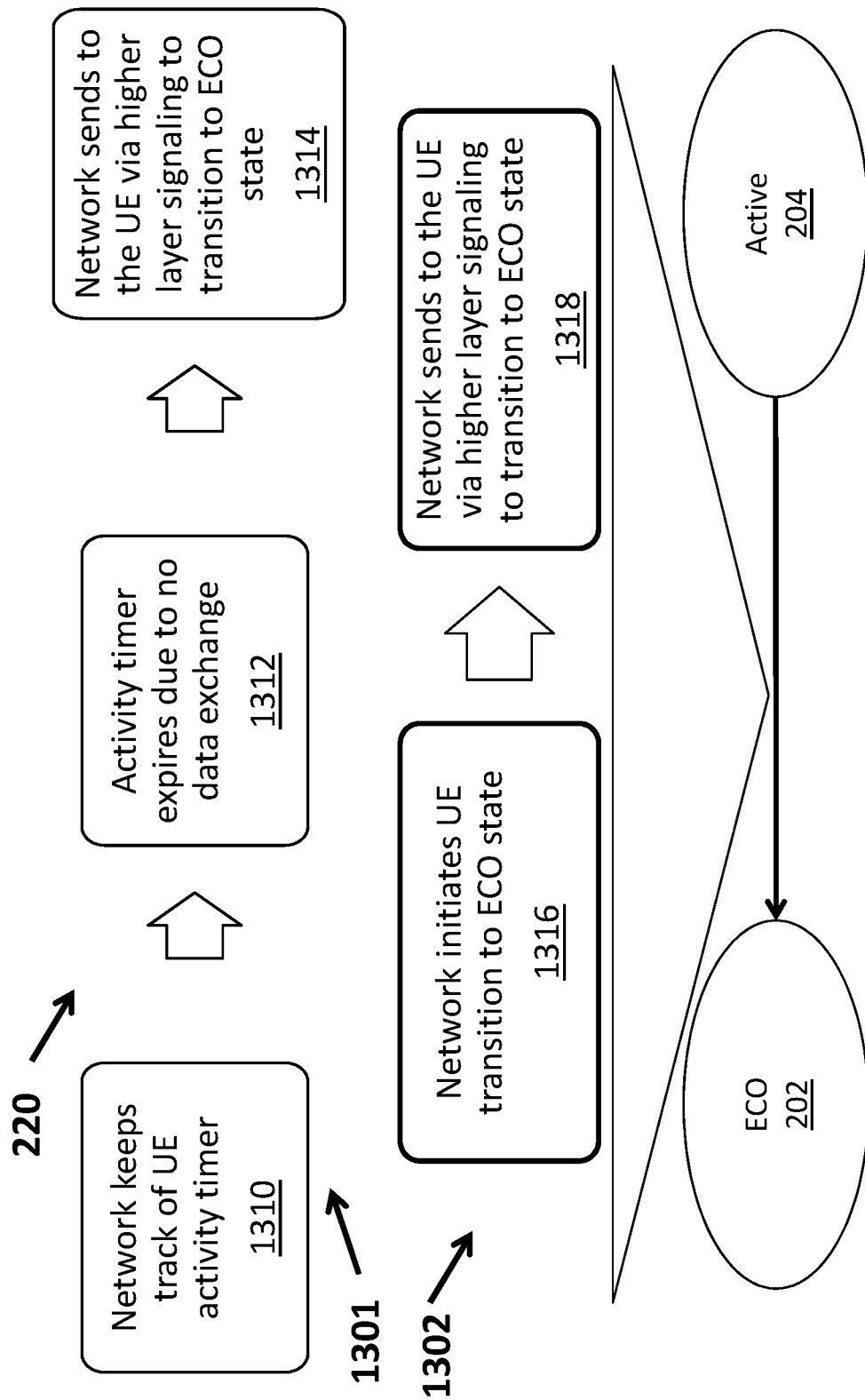
FIG. 13 is a block diagram that illustrates an example of a state transition procedure for moving from UE first (Active) state to a UE second (ECO) state.

FIG. 13 illustrates state transition procedure 220 for moving from a UE Active state 204 to a UE ECO state 202. The Active to ECO state transition can be triggered by an activity timer expiry UE 104 (procedure 1301) or can be network initiated for other reasons (procedure 1302). In the case of timer expiry procedure 1301, the following actions are taken in example embodiments: Network controller 106 keeps track of a UE activity timer (Action 1310); UE activity timer expires due to no data exchange (Action 1312); Controller 106 causes network to send to the UE 104 via higher layer signaling (for example in the control layer) an instruction to transition to ECO state (Action 1314).

In procedure 1302, the network controller 106 proactively initiates the UE transition to the ECO state (Action 1316), and sends an instruction to transition to ECO state to the UE 104 via higher layer signaling (for example in the radio resource control (RRC) layer) (Action 1318).

Figure 14:
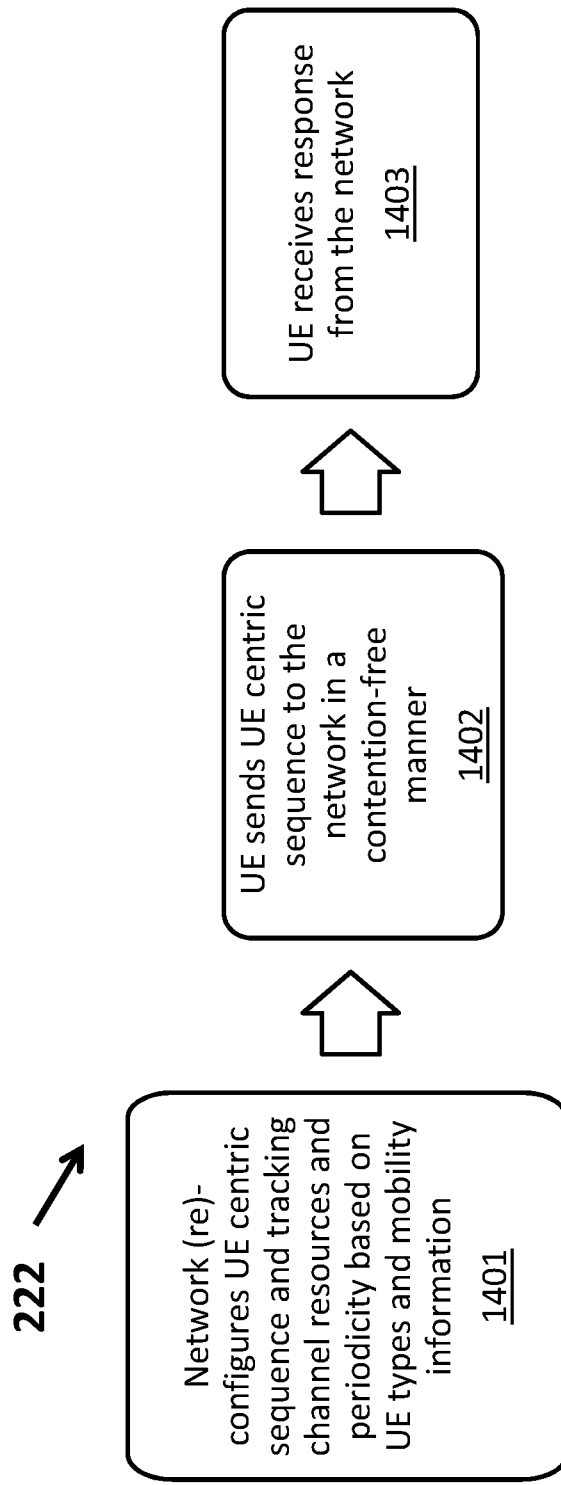
FIG. 14 is a block diagram that illustrates an example of a UE tracking procedure performed when the UE is in the second (ECO) state.

As noted above, in example embodiments, tracking procedure 222 is performed exclusively in the ECO state 202. A suitable tracking procedure is described in detail in the document mentioned above entitled: "System and Method for a Tracking Channel" (U.S. patent application Ser. No. 15/009,626 filed Jan. 28, 2016). The tracking procedure 222 in ECO state enables monitoring of UEs 104 by controller 106 and in at least some examples uses less network t/f resources than are used in the active state network-oriented measurement procedure 216 discussed above. Among other things, such ECO state tracking may, in at least some applications, provide one or more of the following features: facilitate a contention-free procedure with UE centric sequence, shorten response time by eliminating the contention resolution and RNTI assignment, and increase the capacity of random access by avoiding collision. As noted above, during the initial access procedure, a UE-centric sequence (UE SEQ 242) is assigned to UE 104 and a UL tracking channel resource (UL TC T/F 244) is also assigned to UE 104. These assigned characteristics are used by UE 104 and the network for tracking procedure 222. In this regard, FIG. 14 provides a summary of tracking procedure 222, which includes the following actions: Network controller 106 (re-)configures UE centric sequence (UE SEQ 242) and tracking channel resources (UL TC T/F 244) and periodicity based on UE types and mobility information (Action 1401); UE 104 sends UE centric sequence (UE SES 242) to the network (logical entity 110) in a contention-free manner using the assigned tracking channel resources (Action 1402); and UE receives response from the network (logical entity 110).

As noted above, in example embodiments, DL data notification procedure 224 is performed exclusively in the ECO state 202. A suitable DL data notification procedure 224 is described in detail in the document mentioned above entitled: "Apparatus And Method For a Wireless Device To Receive Data in an Eco State". DL data notification procedure 224 provides a UE-specific notification (indication) of pending DL data transmission when the UE is in the "ECO" state 202, and can be used to facilitate DL data transmission in the ECO state using the grant-free transmission procedure 212 (such that no dynamic resource allocation is required). This can enable a reduced set of radio resources (reserved, pre-configured) for data transmission. FIG. 15 provides a summary of DL Data notification procedure 224, which includes the following actions in an example embodiment: in ECO state, UE 104 monitors DL data notification (Action 1501); optionally, UE sends additional measurements (1502); within a defined time duration, the UE expects to receive DL data while in the ECO state, over a grant-free DL channel (Action 1503).

As noted above, deregistration procedure 226 is supported in both UE states in example embodiments. Deregistration can be triggered by events such as UE power off, or occurrence of a registration timer expiry. A registration timer expiry may, for example, occur on the network side when no data activities such as tracking procedure 222 occur for a predetermined time duration or at the UE side when UE 104 does not receive responses from the network for a predetermined duration. FIG. 16A illustrates a summary of a power off deregistration procedure, which is initiated when UE 104 sends a deregistration message to the network entity 110 as part of a power off procedure (Action 1602). The controller 106 deregisters UE in response to the deregistration message (Action 1604). FIG. 16B illustrates a registration timer expiry deregistration procedure, which is initiated when a registration timer expires at either the network or UE (Action 1606), resulting in the controller 106 deregistering the UE (Action 1608).

FIG. 17 is a block diagram of a processing system 900 that may be used for implementing the UE and network devices and methods disclosed herein. Specific devices may utilize all of the components shown, or only a subset of the components and levels of integration may vary from device to device. Furthermore, a device may contain multiple instances of a component, such as multiple processing units, processors, memories, transmitters, receivers, etc. The processing system 900 may comprise a processing unit 901 equipped with one or more input/output devices, such as a speaker, microphone, mouse, touchscreen, keypad, keyboard, printer, display, and the like. The processing unit 901 may include a central processing unit (CPU) 910, memory 920, a mass storage device 930, a network interface 950, an I/O interface 960, and an antenna circuit 970 connected to a bus 940. The processing unit 901 also includes an antenna element 975 connected to the antenna circuit.

The bus 940 may be one or more of any type of several bus architectures including a memory bus or memory controller, a peripheral bus, video bus, or the like. The CPU 910 may comprise any type of electronic data processor. The memory 920 may comprise any type of system memory such as static random access memory (SRAM), dynamic random access memory (DRAM), synchronous DRAM (SDRAM), read-only memory (ROM), a combination thereof, or the like. In an embodiment, the memory 920 may include ROM for use at boot-up, and DRAM for program and data storage for use while executing programs.

The mass storage device 930 may comprise any type of storage device configured to store data, programs, and other information and to make the data, programs, and other information accessible via the bus 940. The mass storage device 930 may comprise, for example, one or more of a solid state drive, hard disk drive, a magnetic disk drive, an optical disk drive, or the like.

The I/O interface 960 may provide interfaces to couple external input and output devices to the processing unit 901. The I/O interface 960 may include a video adapter. Examples of input and output devices may include a display coupled to the video adapter and a mouse/keyboard/printer coupled to the I/O interface. Other devices may be coupled to the processing unit 901 and additional or fewer interface cards may be utilized. For example, a serial interface such as Universal Serial Bus (USB) (not shown) may be used to provide an interface for a printer.

The antenna circuit 970 and antenna element 975 may allow the processing unit 901 to communicate with remote units via a network. In an embodiment, the antenna circuit 970 and antenna element 975 provide access to a wireless wide area network (WAN) and/or to a cellular network, such as Long Term Evolution (LTE), Code Division Multiple Access (CDMA), Wideband CDMA (WCDMA), and Global System for Mobile Communications (GSM) networks. In some embodiments, the antenna circuit 970 and antenna element 975 may also provide Bluetooth and/or WiFi connection to other devices.

The processing unit 901 may also include one or more network interfaces 950, which may comprise wired links, such as an Ethernet cable or the like, and/or wireless links to access nodes or different networks. The network interface 901 allows the processing unit 901 to communicate with remote units via the networks 980. For example, the network interface 950 may provide wireless communication via one or more transmitters/transmit antennas and one or more receivers/receive antennas. In an embodiment, the processing unit 901 is coupled to a local-area network or a wide-area network for data processing and communications with remote devices, such as other processing units, the Internet, remote storage facilities, or the like.

Although the present disclosure describes methods and processes with steps in a certain order, one or more steps of the methods and processes may be omitted or altered as appropriate. One or more steps may take place in an order other than that in which they are described, as appropriate.

While the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein. In example embodiments, the UE 104, TRPs 102 and network controller 106 each comprise a memory 920 tangibly storing executable instructions that, when executed by CPU 910 to cause the UE 104, TP 102 or network controller 106 to perform the functions and procedures described above.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, while the systems, devices and processes disclosed and shown herein may comprise a specific number of elements/components, the systems, devices and assemblies could be modified to include additional or fewer of such elements/components. For example, while any of the elements/components disclosed may be referenced as being singular, the embodiments disclosed herein could be modified to include a plurality of such elements/components. The subject matter described herein intends to cover and embrace all suitable changes in technology.

The invention claimed is:

1. A method comprising:
   sending, by a network node to a first user equipment (UE) that is in an active state, a UE identifier (UE ID) that is uniquely assigned to the first UE;
   obtaining, by the network node from the first UE, capability information indicating whether the UE supports a downlink (DL) grant-free transmission mode;
   sending, by the network node, information about a DL grant-free transmission channel to the first UE; and
   transmitting, by the network node to the first UE that is in a first state that supports a reduced set of UE functionality compared to the active state and the first state supporting data communication between the first UE and the network node, data in the DL grant-free transmission channel according to the capability information, the data being transmitted with the UE ID assigned to the first UE in the active state.

2. The method according to claim 1, further comprising, before sending the information about the DL grant-free transmission channel:
determining, by the network node, the DL grant-free transmission channel to be shared by the first UE and at least one other UE that is in one of the first state and the active state.

3. The method according to claim 1, wherein the information about the DL grant-free transmission channel is broadcast by the network node to multiple UEs including the first UE.

4. The method according to claim 1, wherein the information about the DL grant-free transmission channel indicates a radio resource of the DL grant-free transmission channel.

5. The method according to claim 1, further comprising:
determining, by the network node, a modulation and coding scheme (MCS) to transmit data to the DL grant-free transmission mode to the first UE that is in the first state.

6. The method according to claim 5, the method further comprising:
determining, by the network node, the first UE that is in the first state as a target device of data.

7. The method according to claim 6, wherein the data is transmitted with the determined MCS in the DL grant-free transmission channel.

8. The method according to claim 1, wherein the first state supports a data transfer connectivity without dynamic resource allocation grant from the network node.

9. The method according to claim 3, wherein the information about the DL grant-free transmission channel is broadcast by the network node to the multiple UEs including the first UE, while the first UE is in the first state.

10. An apparatus comprising a processor coupled with a memory, the processor configured to:
send, to a first user equipment (UE) that is in an active state, a UE identifier (UE ID) that is uniquely assigned to the first UE;
obtain, from the first UE, capability information indicating whether the UE supports a downlink (DL) grant-free transmission mode;
send information about a DL grant-free transmission channel to the first UE; and
transmit, to the first UE that is in a first state that supports a reduced set of UE functionality compared to the active state and the first state supporting data communication between the first UE and the apparatus, data in the DL grant-free transmission channel according to the capability information, the data being transmitted with the UE ID assigned to the first UE in the active state.

11. A method comprising:
receiving, by a first user equipment (UE) from a network node, while the first UE is in an active state, a UE identifier (UE ID) that is uniquely assigned to the first UE;
sending, by the first UE to the network node, capability information indicating whether the first UE supports a downlink (DL) grant-free transmission mode;
receiving, by the first UE from the network node, information about a DL grant-free transmission channel;
transitioning, by the first UE, from the active state to a first state that supports a reduced set of UE functionality compared to the active state and the first state supporting data communication between the first UE and the network node; and
receiving, from the network node, by the first UE that is in the first state, data in the DL grant-free transmission channel, the data being received with the UE ID assigned to the first UE in the active state.

12. The method according to claim 11, wherein the information about the DL grant-free transmission channel indicates a radio resource of the DL grant-free transmission channel.

13. The method according to claim 11, wherein the information about the DL grant-free transmission channel is in a broadcast message.

14. The method according to claim 11, wherein the DL grant-free transmission channel is shared by the first UE and at least one other UE that is in one of the first state and the active state.

15. The method according to claim 11, wherein the UE ID is a UE dedicated connection identifier (UE DCID).

16. The method according to claim 11, wherein receiving data comprises:
determining, by the first UE, a radio resource for a DL grant-free transmission based on the received information;
performing, by the first UE that is in the first state, a blind detection on a transmission of the data the determined radio resource; and
decoding, by the first UE that is in the first state, detected data.

17. The method according to claim 16, wherein the data is decoded according to information associated with a pre-configured modulation and coding scheme (MCS).

18. The method according to claim 11, wherein the state supports a data transfer connectivity without dynamic resource allocation grant from the network node.

19. An apparatus comprising a processor coupled with a memory, the processor configured to:
receive, from a network node, while the apparatus is in an active state, a user equipment identifier (UE ID) that is uniquely assigned to the apparatus;
send, to the network node, capability information indicating whether the apparatus supports a downlink (DL) grant-free transmission mode;
receive information about a DL grant-free transmission channel from the network node;
transition from the active state to a first state that supports a reduced set of apparatus functionality compared to the active state and the first state supporting data communication between the apparatus and the network node; and
receive data from the network node, when the apparatus is in the first state, in the DL grant-free transmission channel, the data being received with the UE ID assigned to the first UE in the active state.

* * * * *